(12) United States Patent
Takahashi et al.

(10) Patent No.: US 11,039,570 B2
(45) Date of Patent: Jun. 22, 2021

(54) WORKING MACHINE AND METHOD OF BRAKING DRIVING DEVICE OF WORKING MACHINE

(71) Applicant: MAKITA CORPORATION, Anjo (JP)

(72) Inventors: Yuji Takahashi, Anjo (JP); Kouichi Takeda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 418 days.

(21) Appl. No.: 15/724,438

(22) Filed: Oct. 4, 2017

(65) Prior Publication Data

US 2018/0092298 A1 Apr. 5, 2018

(30) Foreign Application Priority Data

Oct. 5, 2016 (JP) .............................. JP2016-197440

(51) Int. Cl.
| | | |
|---|---|---|
| *A01D 34/00* | (2006.01) | |
| *A01D 34/90* | (2006.01) | |
| *A01D 34/84* | (2006.01) | |
| *A01G 23/08* | (2006.01) | |
| *A01G 3/08* | (2006.01) | |
| *A01D 34/416* | (2006.01) | |
| *A01D 34/82* | (2006.01) | |

(52) U.S. Cl.
CPC ....... *A01D 34/006* (2013.01); *A01D 34/4167* (2013.01); *A01D 34/828* (2013.01); *A01D 34/84* (2013.01); *A01G 3/088* (2013.01); *A01G 23/08* (2013.01); *A01D 34/90* (2013.01)

(58) Field of Classification Search
CPC .............. A01D 34/006; A01D 34/4167; A01D 34/828; A01D 34/84; A01D 34/90

USPC ............................................................. 173/2
See application file for complete search history.

(56) References Cited

U.S. PATENT DOCUMENTS

| | | | | |
|---|---|---|---|---|
| 5,636,444 A | * | 6/1997 | Nickel | F16D 49/08 |
| | | | | 188/170 |
| 5,862,730 A | * | 1/1999 | Cartwright | B26D 5/00 |
| | | | | 83/42 |
| 6,823,591 B2 | * | 11/2004 | Kobayashi | A01D 34/90 |
| | | | | 30/276 |

(Continued)

FOREIGN PATENT DOCUMENTS

| JP | 3049444 U | 6/1998 |
|---|---|---|
| JP | 2002-209419 A | 7/2002 |

(Continued)

OTHER PUBLICATIONS

Notice of Reasons for Refusal dated Jul. 28, 2020 from the Japanese Patent Office in Application No. 2016-197440.

*Primary Examiner* — Thanh K Truong
*Assistant Examiner* — David G Shutty
(74) *Attorney, Agent, or Firm* — Sughrue Mion, PLLC (57) ABSTRACT

A working machine according to one aspect of the present disclosure comprises an operating device, a working tool, a driving device, a braking device, a detection device, and a change device. The detection device detects a mode of an operation performed on the operating device. The change device changes a brake control to be performed by the braking device according to the mode detected by the detection device.

7 Claims, 6 Drawing Sheets

(56) References Cited

U.S. PATENT DOCUMENTS

| | | | | |
|---|---|---|---|---|
| 2010/0294098 A1* | 11/2010 | Nakadate | ............... | A01D 75/20 |
| | | | | 83/62.1 |
| 2011/0232436 A1 | 9/2011 | Morabit | | |
| 2012/0279743 A1* | 11/2012 | Suda | ................ | B25F 5/001 |
| | | | | 173/176 |
| 2014/0115903 A1* | 5/2014 | Proudlock | ............ | A01D 34/412 |
| | | | | 30/276 |
| 2014/0165525 A1* | 6/2014 | Nagata | ................... | A01D 34/78 |
| | | | | 56/11.2 |
| 2015/0357853 A1* | 12/2015 | Suzuki | .................... | H02P 29/00 |
| | | | | 318/139 |
| 2016/0021819 A1* | 1/2016 | Nakano | ................. | A01G 3/062 |
| | | | | 30/276 |
| 2017/0332541 A1* | 11/2017 | Gyuricza | ............... | A01B 1/227 |

FOREIGN PATENT DOCUMENTS

| | | |
|---|---|---|
| JP | 2002-209420 A | 7/2002 |
| JP | 2009-171869 A | 8/2009 |
| JP | 2010-124700 A | 6/2010 |
| JP | 2012-055195 A | 3/2012 |
| JP | 2013-165677 A | 8/2013 |
| JP | 2014-117244 A | 6/2014 |
| JP | 2014-117267 A | 6/2014 |

\* cited by examiner

WORKING MACHINE AND METHOD OF BRAKING DRIVING DEVICE OF WORKING MACHINE

CROSS-REFERENCE TO RELATED APPLICATIONS

This application claims the benefit of Japanese Patent Application No. 2016-197440 filed on Oct. 5, 2016 with the Japan Patent Office, the entire disclosure of which is incorporated herein by reference.

BACKGROUND

The present disclosure relates to a working machine that drives a working tool to perform a work corresponding to the working tool.

A working machine has been known that is configured to have a working tool such as a cutting blade in a circular disc shape provided to a leading end of an elongated pipe and to rotate the working tool by a power source such as a motor or an internal combustion engine to perform a work such as grass cutting.

Working machines of this type include a working machine provided with a brake that forcibly stops the rotation of the working tool to ensure the safety of the operator from the working tool when an unexpected condition, such as a fall of the operator, arises during the work.

For example, Japanese Unexamined Patent Application Publication No. 2002-209420 discloses a technique in which a single lever performs functions from releasing the brake to driving the power source to facilitate the operations of the operator.

SUMMARY

Working machines such as electric grass cutters have an operation mode in which the rotational speed is controlled by an intermittent operation that repeatedly turns on and off a trigger switch alternately. However, if the technique in which a single lever performs the functions from releasing the brake to driving the power source is applied to the trigger switch, the brake is applied immediately when the trigger switch is turned off. It has thus been difficult to perform the above-described intermittent operation.

It is desirable, in one aspect of the present disclosure, to provide a working machine that ensures safety of an operator while being applicable to various operation modes.

A working machine according to one aspect of the present disclosure comprises an operating device, a working tool, a driving device, a braking device, a detection device, and a change device. The operating device is operated by an operator of the working machine. The working tool performs a work using a rotational force. The driving device rotationally drives the working tool in response to an operation performed on the operating device. The braking device performs a brake control that reduces a rotational speed of the driving device if the operation performed on the operating device is an off operation in which non-driving is commanded to the driving device. The detection device detects a mode of the operation performed on the operating device. The change device changes the brake control according to the mode detected by the detection device.

The working machine thus configured is capable of performing brake controls such as, for example, an emergency stop and free running, depending on conditions presumed from the mode of the operation performed on the operating device. This ensures safety of the operator while allowing for operation of the working tool according to various operation modes.

The detection device may detect, as the mode, a duration of an on operation in which driving of the driving device is commanded to the driving device. The change device may change the brake control to a normal brake control if the duration of the on operation detected by the detection device is longer than a threshold on time that has been preset. The normal brake control is a brake control that uses a normal braking force that has been preset.

The working machine thus configured performs the normal brake control immediately when the off operation is performed after the on operation has continued for longer than the threshold on time. This ensures the safety of a user since braking is applied immediately if the operation performed on the operating device by the user is changed from the on operation to the off operation for reasons such as a fall of the user.

The detection device may further be configured to detect a duration of the off operation as the mode. The change device may, in a case where the duration of the on operation detected by the detection device is equal to or shorter than the threshold on time, (i) change the brake control to the normal brake control if the duration of the off operation detected by the detection device is longer than a threshold off time that has been preset, and (ii) change the brake control to a weak brake control if the duration of the off operation is equal to or shorter than the threshold off time. The weak brake control is a brake control that uses a braking force weaker than the normal braking force.

In other words, in the case where the duration of the on operation is equal to or shorter than the threshold on time, that is, where the on operation continues for a relatively short time, the normal brake control is not performed immediately but the weak brake control is performed using a weak braking force until the threshold off time elapses. If the operation performed on the operating device is not changed from the off operation to the on operation during the threshold off time, then the normal brake control is started. This inhibits a braking using a relatively strong braking force from being performed when, for example, an intermittent operation is performed in which the on operation and the off operation are repeated alternately to control a rotational speed of the working tool.

The threshold off time may be set to be longer than a standard duration of the off operation for the intermittent operation. Further, the threshold on time may be set to be longer than a standard duration of the on operation for the intermittent operation.

The driving device may comprise an electric motor. In such a case, the brake control may use free running of the electric motor where an excitation current path to the electric motor is open and/or short-circuit braking where the excitation current path to the electric motor is short-circuited.

Another aspect of the present disclosure is a method of braking a driving device of a working machine. The method comprises performing a brake control that reduces a rotational speed of the driving device if an operation performed on an operating device of the working machine is an off operation in which non-driving of the driving device is commanded to the driving device, detecting a mode of the operation performed on the operating device, and changing the brake control according to the mode detected.

Such a method can provide similar effects to those of the above-described working machine.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

1. Configuration

This example embodiment describes the present disclosure when applied to a grass cutter as one example of a working machine.

Figure 1:
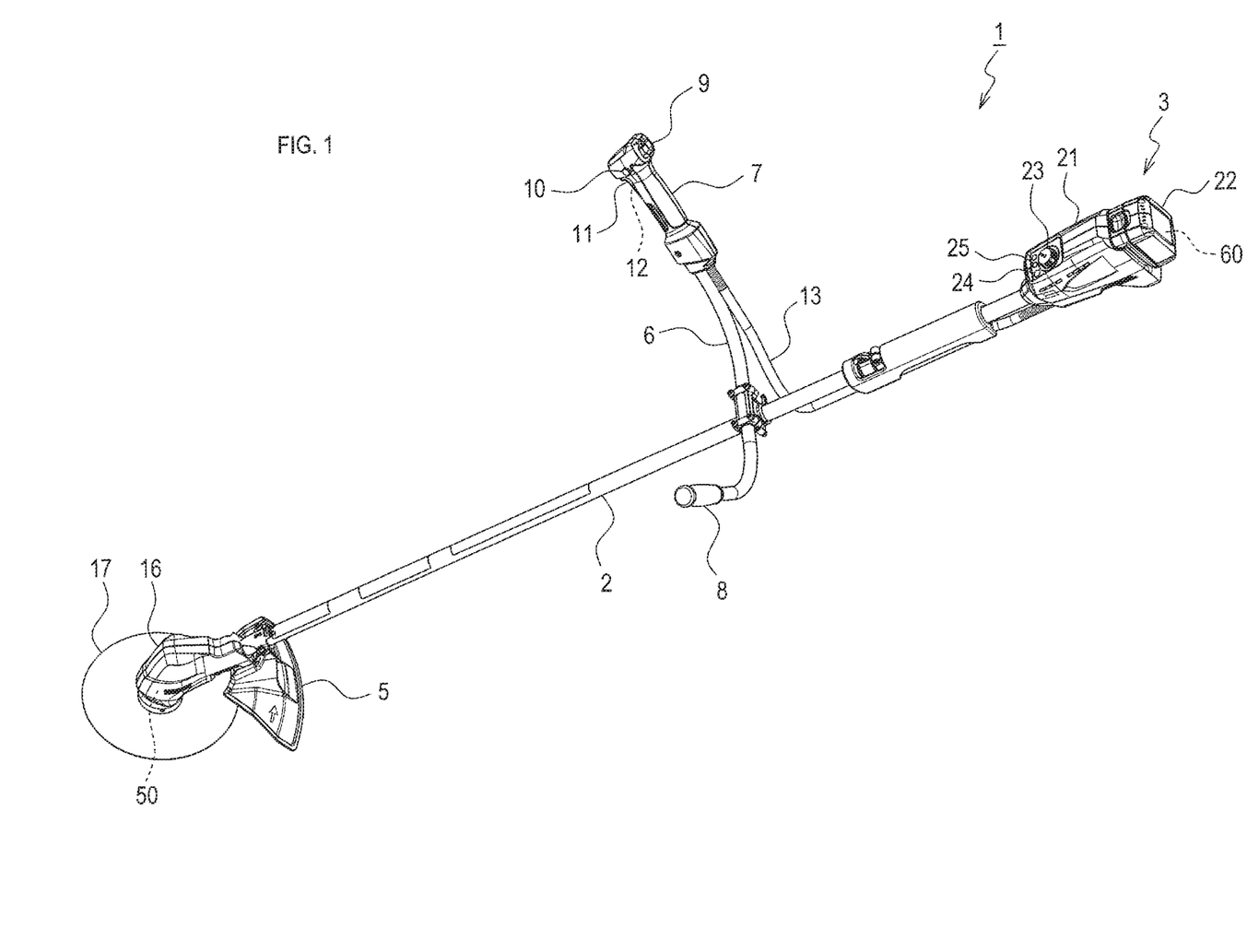
FIG. 1 is a perspective view of an embodiment of a grass cutter.

As shown in FIG. 1, a grass cutter 1 of the present embodiment comprises a main pipe 2, a control unit 3, a motor housing 16, and a handle 6. The main pipe 2 is formed in an elongated and hollow rod shape. The control unit 3 is provided to a rear end of the main pipe 2, and the motor housing 16 and a cover 5 are provided to a front end of the main pipe 2.

The cutting blade 17 is a working tool for cutting down targets for the cutting, such as grass and small-diameter trees (hereinafter, referred to as grass and other plants) and is configured to be removably attached to the motor housing 16. The cutting blade 17 is made of metal having a circular disc shape and has saw blade teeth formed along an entire outer periphery thereof. The cover 5 is provided to help prevent grass and other plants cut down by the cutting blade 17 from flying toward a user of the grass cutter 1 (hereinafter, referred to as an operator).

Equipped inside the motor housing 16 is a motor 50 for rotating the cutting blade 17. A rotational force produced by driving of the motor 50 is transmitted to a working-tool rotation axis to which the cutting blade 17 is attached via a deceleration mechanism.

While the cutting blade 17 is being rotated by the motor 50, the operator can cut grass and other plants, thus performing a work of cutting them down, by bringing the outer periphery of the cutting blade 17 in contact with the grass and other plants.

The grass cutter 1 can use a nylon cord, in place of the cutting blade 17, as a working tool for cutting down grass and other plants. In this case, a known nylon cord assembly, in place of the cutting blade 17, may be attached to the motor housing 16.

The handle 6 is formed in a U shape and is joined to the main pipe 2 in a vicinity of a lengthwise middle portion of the main pipe 2. The handle 6 has, at a first end of both ends thereof, a right grip 7 to be held by the right hand of the operator, and has, at a second end of both ends thereof, a left grip 8 to be held by the left hand of the operator.

The right grip 7 is provided, at a leading end thereof, with a forward/reverse changeover switch 9, a lock off button 10, and a trigger lever 11. The forward/reverse changeover switch 9 switches a rotational direction of the motor 50, that is, a rotational direction of the cutting blade 17, to either forward direction or reverse direction. The forward direction is a direction of rotation set to cut down grass and other plants, and the reverse direction is a direction of rotation set to remove grass and other plants caught in the cutting blade 17.

The trigger lever 11 is an operating member to be operated by the operator to give a command to rotate or stop the cutting blade 17. Arranged inside the right rip 7 is a trigger switch 12 that operates in conjunction with the trigger lever 11. The trigger switch 12 is on when the trigger lever 11 is operated and is off when the trigger lever 11 is not operated, outputting a trigger signal TS that indicates an on state or an off state of the trigger switch 12.

The lock off button 10 is a button for prevention of unintentional activation of the cutting blade 17. When the lock off button 10 is not pressed down, the lock off button 10 is mechanically engaged with the trigger lever 11. This restricts movement of the trigger lever 11, preventing the trigger switch 12 from entering the on state. When the lock off button 10 is pressed down, the engagement of the lock off button 10 with the trigger lever 11 is released. This allows generation of a trigger signal TS based on operation of the trigger lever 11.

Provided between a bottom end of the right grip 7 and a front end of the control unit 3 is a control wiring pipe 13. The control wiring pipe 13 is formed in a hollow rod shape and accommodates therein a control harness. The control harness is wiring that electrically connects/couples the trigger switch 12 and the forward/reverse changeover switch 9 to the control unit 3.

The control unit 3 comprises a rear-end housing 21 and a battery pack 22. The battery pack 22 is configured to be removably attached to a rear end of the rear-end housing 21.

The battery pack 22 contains a battery 60. The battery 60 is a power source to supply electric power to components in the rear-end housing 21 and to the motor 50. The battery 60 is a repeatedly rechargeable power source, one example of which is a lithium-ion rechargeable battery. One example of the rated voltage of the battery 60 is 18 V.

At a front end of the rear-end housing 21, a speed change dial 23 and a main switch 24 are provided in such a manner as to be operable by the operator and a display 25 for notification of an operational state, abnormality, etc. is provided in such a manner as to be visible to the operator.

The speed change dial 23 is a dial to variably set a rotational speed of the motor 50.

The main switch 24 is a switch to start power supply from the battery 60 to various parts, thus bringing the grass cutter 1 into a usable state.

The display 25 comprises an indicator that is lit up when electric power is supplied to various parts by operation of the main switch 24, a remaining energy indicator that indicates remaining energy of the battery 60, a reverse rotation indicator that indicates the rotation is in reverse, etc. The remaining energy is an amount of power remaining in the battery 60.

Arranged inside the rear-end housing 21 is a motor drive 30. A major function of the motor drive 30 is a motor control function to control the rotational speed of the motor 50 by controlling electric power supplied to the motor 50.

2. Motor Drive

Figure 2:
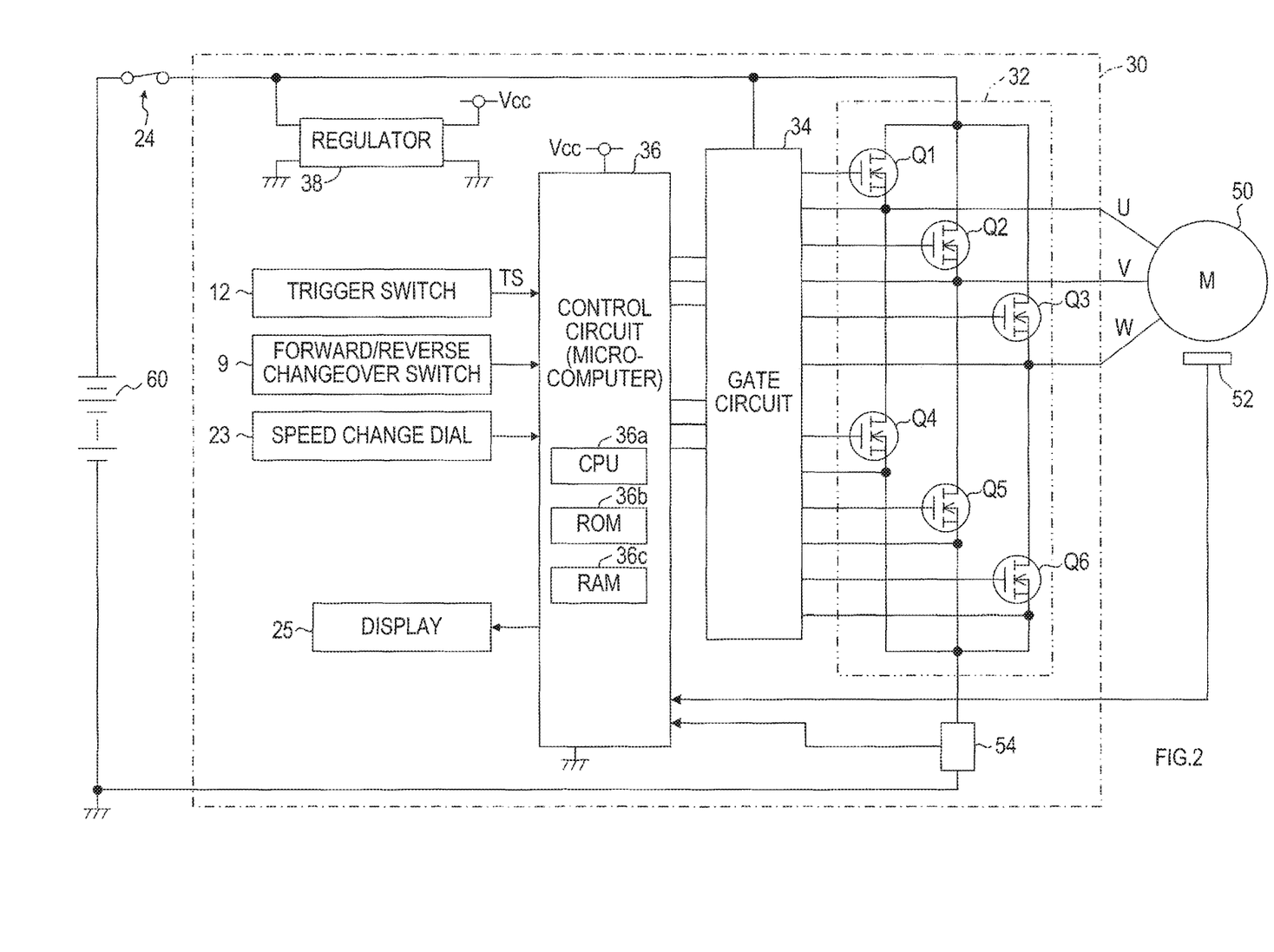
FIG. 2 is a block diagram illustrating a configuration of a motor drive.

A configuration of the motor drive 30 will be described next.

As shown in FIG. 2, the motor drive 30 is coupled, via the main switch 24, to the battery 60. When the main switch 24 is on, the motor drive 30 receives electric power supplied from the battery 60 and is in a state of being capable of driving the motor 50.

The motor drive 30 comprises a drive circuit 32, a gate circuit 34, a control circuit 36, and a regulator 38.

The drive circuit 32 is a circuit that receives electric power supplied from the battery 60 and passes a current through individual windings corresponding to respective phases of the motor 50. The motor 50 is a three-phase brushless motor, and the drive circuit 32 is a three-phase full bridge circuit including six switching elements Q1 to Q6. Each of the switching elements Q1 to Q6 is, for example, a MOSFET, but is not limited thereto.

In the drive circuit 32, the switching elements Q1 to Q3 are provided as so-called high-side switches between individual terminals U, V, W of the motor 50 and a power supply line connected to a positive electrode of the battery 60.

The remaining switching elements Q4 to Q6 are provided as so-called low-side switches between the individual terminals U, V, W of the motor 50 and a ground line connected to a negative electrode of the battery 60.

The gate circuit 34 turns on and off the switching elements Q1 to Q6 in the drive circuit 32 in response to a control signal outputted from the control circuit 36, thus sequentially passing a current through the individual windings of the motor 50 to rotate the motor 50. When the switching elements Q1 to Q6 are all off, the motor 50 is in a free-run state. When the switching elements Q1 to Q3 are all off and the switching elements Q4 to Q6 are all on, the motor 50 is in a state where so-called short-circuit braking is applied thereto.

When the main switch 24 is on, the regulator 38 receives electric power supplied from the battery 60 and produces a constant power voltage Vcc (for example, DC 5V) necessary to operate the control circuit 36.

The control circuit 36 comprises a microcontroller containing a CPU 36a, a ROM 36b, and a RAM 36c. The trigger switch 12, the forward/reverse changeover switch 9, the speed change dial 23, and the display 25, described above, are connected to the control circuit 36.

In the motor drive 30, a current detection circuit 54 that detects a value of the current flowing through the motor 50 is provided in a current flow path from the drive circuit 32 to the negative electrode of the battery 60. Provided near the motor 50 is a Hall IC 52 that detects a rotational position of a rotor included in the motor 50. The control circuit 36 receives input of detection signals outputted from the current detection circuit 54 and the Hall IC 52.

The control circuit 36 is operated by electric power supplied from the regulator 38. When the trigger switch 12 is operated, the control circuit 36 obtains the rotational position and rotational speed of the rotor on the basis of a rotation detection signal from the Hall IC 52 and drives the motor 50 toward a specified rotational direction at a specified rotational speed according to settings of the forward/reverse changeover switch 9 and the speed change dial 23. Moreover, the control circuit 36 selects and performs, according to an operation mode of the trigger switch 12, one of a plurality of braking methods of the motor 50. The plurality of braking methods includes a method to bring the motor 50 into the free-run state and a method to bring the motor 50 into the state where short-circuit braking is applied thereto.

The control circuit 36 controls the rotational speed of the motor 50 by changing a drive duty ratio of the control signal and changes the rotational direction and a braking state by changing timings to turn on and off the switching elements Q1 to Q6. The control signal is a signal outputted from the control circuit 36 to the gate circuit 34 to turn on and off the switching elements Q1 to Q6 included in the drive circuit 32.

The control circuit 36 also performs processes such as an indication process in which a driving state of the motor 50 and the remaining energy of the battery 60 are indicated in the display 25, in addition to the above-described driving process related to the driving of the motor 50. However, descriptions of processes other than the driving process will herein be omitted.

3. Driving Process

Figure 3:
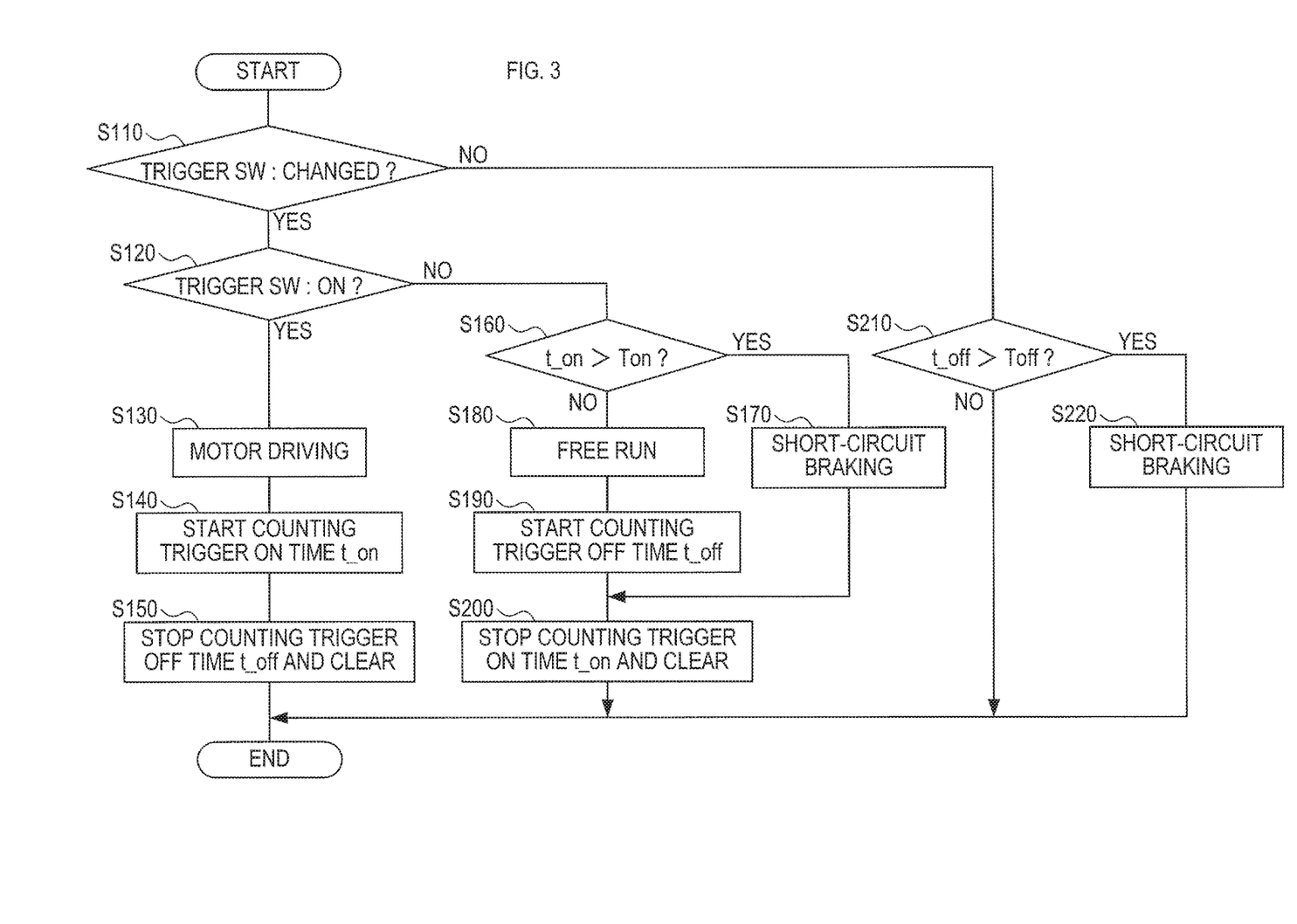
FIG. 3 is a flowchart of a brake control performed by a control circuit.

The driving process, which is a major process of the present disclosure from among various control processes performed by the control circuit 36, will be described next. The driving process is a process in which the driving or braking of the motor 50 is performed according to the operation mode of the trigger lever 11 (therefore, the trigger switch 12). The CPU 36a contained in the control circuit 36 repeatedly performs the driving process in a preset cycle (for example, 1 ms).

As shown in FIG. 3, when this process is activated, the CPU 36a first determines, in S110 (S refers to Step), whether operation on the trigger switch 12 has been changed from an on operation to an off operation, or from the off operation to the on operation. The on operation is an operation to command the driving of the motor 50, and the off operation is an operation to command non-driving of the motor 50. Specifically, it is determined whether a signal level of the trigger signal TS outputted from the trigger switch 12 has been changed. If there has been a change of the operation on the trigger switch 12, the process proceeds to S120.

In S120, it is determined whether the operation on the trigger switch 12 is the on operation as a result of the change of the operation on the trigger switch 12. If it is determined that the operation on trigger switch 12 is the on operation, that is, the change of the operation has been from the off operation to the on operation, the process proceeds to S130.

In S130, the driving of the motor 50 is started via the gate circuit 34, when the rotational direction and a target rotational speed of the motor 50 are set on the basis of setting conditions of the forward/reverse changeover switch 9 and the speed change dial 23.

In S140 to follow, counting of a trigger on time, t_on, is started. The trigger on time, t_on, is a time during which the operation on the trigger switch 12 continues to be the on operation.

In S150 to follow, counting of a trigger off time, t_off, is stopped and the counted value is cleared, and then the process is temporarily terminated. The trigger off time, t_off, is a time during which the operation on the trigger switch 12 continues to be the off operation.

If it is determined, in the preceding S120, that the operation on the trigger switch 12 is the off operation as a result of the change of the operation on the trigger switch 12, that is, the change of the operation has been from the on operation to the off operation, the process proceeds to S160.

In S160, it is determined whether the trigger on time, t_on, of which counting has been started in the preceding S140, is larger than a preset threshold on time, Ton. The threshold on time, Ton, is set to be larger than a standard trigger on time for when an intermittent operation is performed. The intermittent operation is an operation to control the rotational speed of the motor 50 by repeating the on operation and the off operation on the trigger switch 12 alternately. A value obtained, for example, by statistically processing measurement results from many subjects is used as the standard trigger on time.

If it is determined, in S160, that the trigger on time, t_on, is larger than the threshold on time, Ton, the process proceeds to S170, where the motor 50 is controlled to enter the state where short-circuit braking is applied thereto. The process then proceeds to S200.

If it is determined, in S160, that the trigger on time, t_on, is equal to or smaller than the threshold on time, Ton, the process proceeds to S180, where the motor 50 is controlled to enter the free-run state. Further, in S190, the counting of the trigger off time, t_off, is started and then the process proceeds to S200.

In S200, the counting of the trigger on time, t_on, is stopped and the counted value is cleared, and then the process is temporarily terminated.

If it is determined, in the preceding S110, that there has been no change of the operation on the trigger switch 12, the process proceeds to S210.

In S210, it is determined whether the trigger off time, t_off, is larger than a preset threshold off time, Toff. The threshold off time, Toff, is set to be larger than a standard trigger off time for when the intermittent operation is performed. The standard trigger off time is set on the basis of actual measurement results as is the case with the trigger on time.

If it is determined, in S210, that the trigger off time, t_off, is larger than the threshold off time, Toff, the process proceeds to S220, where the motor 50 is controlled to enter the state where short-circuit braking is applied thereto. The process is then temporarily terminated.

If it is determined, in S210, that the trigger off time, t_off is equal to or smaller than the threshold off time, Toff, the process is directly terminated temporarily.

The trigger lever 11 and the trigger switch 12 of the present embodiment are one example of the operating device according to one aspect of the present disclosure. The cutting blade 17 of the present embodiment is one example of the working tool according to one aspect of the present disclosure. The motor 50 of the present embodiment is one example of the driving device according to one aspect of the present disclosure. The motor drive 30 of the present embodiment is one example of the braking device, the detection device, and the change device according to one aspect of the present disclosure. In particular, from among processes performed by the CPU 36a, S130 is one example of a process achieved by a function of the driving device; S170, S180, and S220 are one example of a process achieved by a function of the braking device; S140, S150, S190, and S200 are one example of a process achieved by a function of the detection device; and S160 and S210 are one example of a process achieved by a function of the change device.

4. Operation

An example operation of the grass cutter 1 will be described below.

Figure 4:
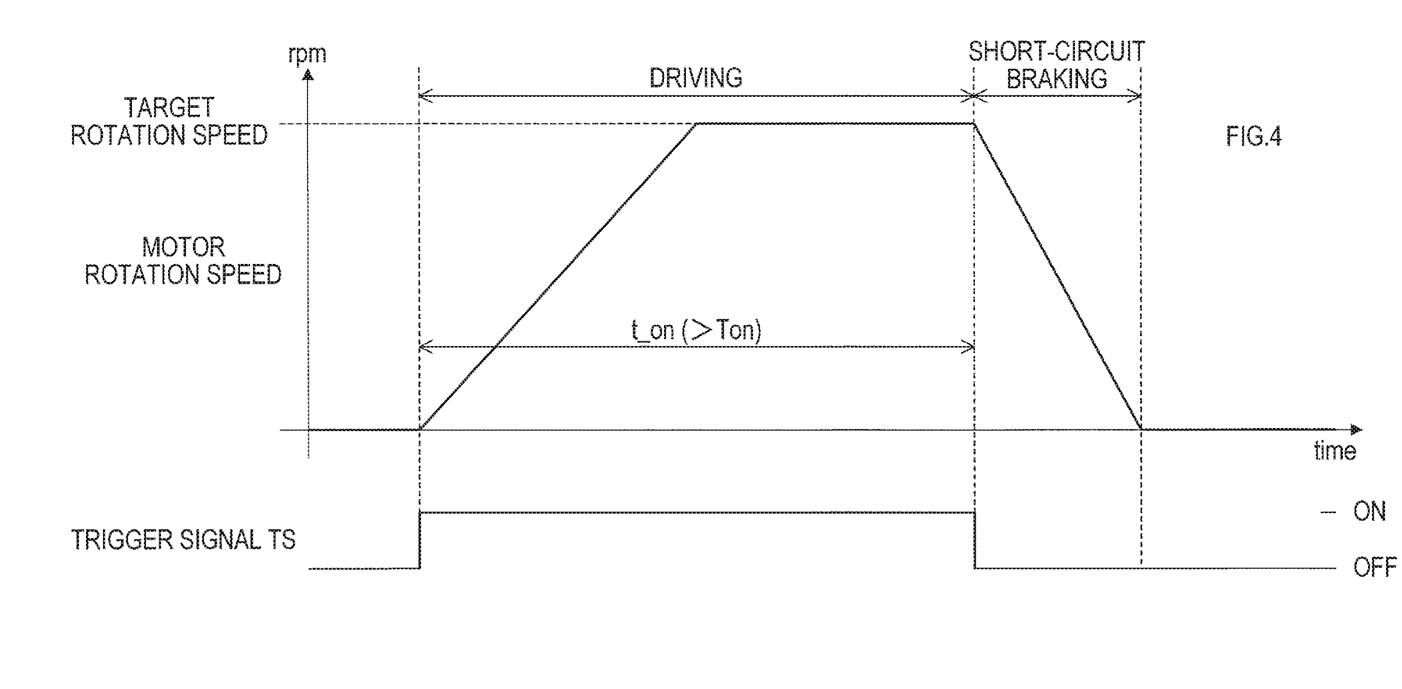
FIG. 4 is an explanatory diagram illustrating a relationship between an operation mode and motor operation.

As shown in FIG. 4, when the operation on the trigger switch 12 (that is, the trigger signal TS) is changed from the off operation to the on operation, the motor 50 is brought into the driving state, where the motor 50 is driven, and the rotational speed of the motor 50 is increased up to a maximum of the target rotational speed determined on the basis of the setting of the speed change dial 23. If the trigger signal TS is later changed to be off after a period of time during which the trigger signal TS is on has continued for longer than the threshold on time, Ton (that is, t_on>Ton), short-circuit braking is immediately applied to the motor 50 to reduce the rotational speed of the motor 50 with a strong braking force. Braking by short-circuit brake is hereinafter referred to also as normal braking.

Figure 5:
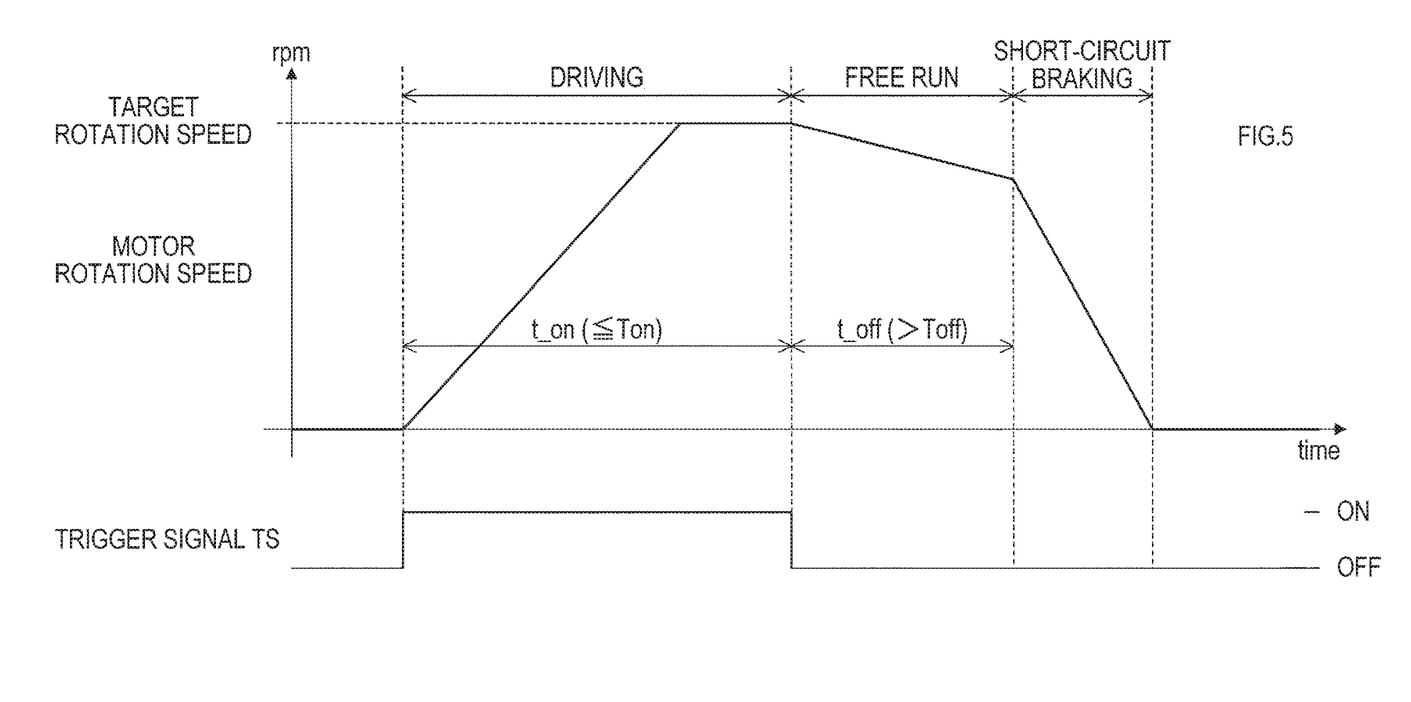
FIG. 5 is an explanatory diagram illustrating a relationship between another operation mode and motor operation.

As shown in FIG. 5, if, on the contrary, the trigger signal TS is changed to be off before the period of time during which the trigger signal TS is on exceeds the threshold on time, Ton (that is, t_on≤Ton), the motor 50 is brought into the free run state, where the rotational speed of the motor 50 is reduced with a weak braking force. Braking by free run is hereinafter referred to also as weak braking. If a period of time during which the trigger signal TS continues to be off (that is, the motor 50 is free running) later exceeds the threshold off time, Toff (that is, t_off>Toff), then short-circuit braking is applied to the motor 50 to reduce the rotational speed of the motor 50 with the strong braking force.

Figure 6:
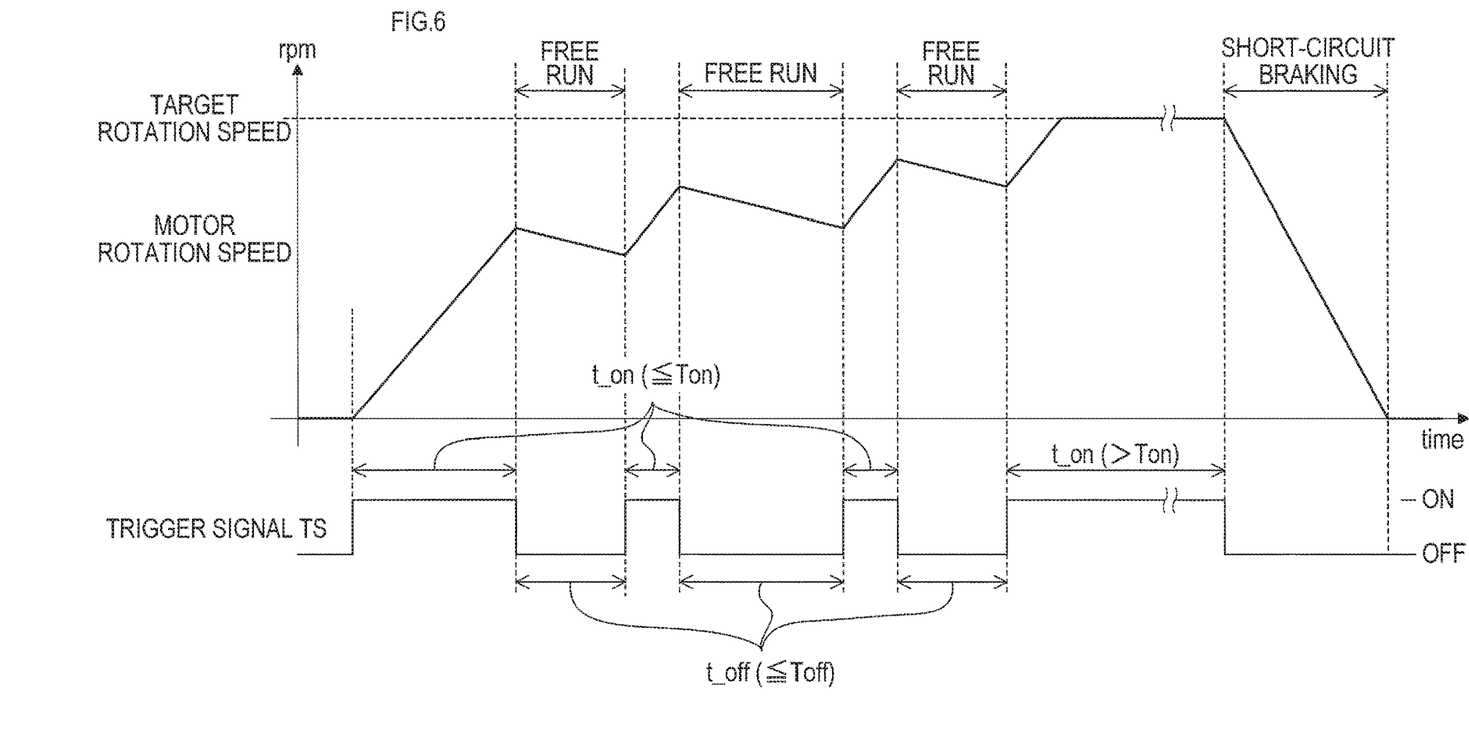
FIG. 6 is an explanatory diagram illustrating a relationship between still another operation mode and motor operation.

As shown in FIG. 6, if the trigger signal TS is changed to be on before the period of time during which the trigger signal TS continues to be off exceeds the threshold off time, Toff (that is, t_off≤Toff), the motor 50 returns to the driving state without going through the state where short-circuit braking is applied thereto. In other words, when the rotational speed of the motor 50 is controlled by the intermittent operation, short-circuit braking is never applied while the trigger signal TS is off, unless the duration of the on operation exceeds the threshold on time, Ton, or unless the duration of the off operation exceeds the threshold off time, Toff.

5. Advantageous Effects

The grass cutter 1 described above in detail provides the following advantageous effects.

(5a) Braking is selected between normal braking (that is, short-circuit braking) and weak braking (that is, free running) according to the operation mode of the trigger switch 12. In the present embodiment, the operation mode of the trigger switch 12 comprises the trigger on time, t_on, which is the duration of the on operation and the trigger off time, t_off, which is the duration of the off operation.

Specifically, when the operation on the trigger switch 12 is changed from the on operation to the off operation, the motor 50 is quickly stopped with the strong braking force, assuming that the operator has no intention of performing the intermittent operation if the trigger on time, t_on, is larger than the threshold on time, Ton. This enables the motor 50 to be quickly stopped, thus improving safety when the trigger switch 12 is turned to be off for reasons other than the intermittent operation such as an unexpected reason, for example, of a fall of the operator.

(5b) If the trigger on time, t_on, is equal to or smaller than the threshold on time, Ton, short-circuit braking is not immediately applied but the motor 50 is temporarily brought into the free-run state, assuming the operator may be performing the intermittent operation. If the operation on the trigger switch 12 is not changed to the on operation after the trigger off time, t_off, later exceeds the threshold off time, Toff, then short-circuit braking is applied. In other words, if the trigger switch 12 is changed from off to on before the threshold off time, Toff, elapses in the free-run state, the motor 50 returns to the driving state without short-circuit braking being applied. Consequently, this inhibits short-circuit braking during the intermittent operation, allowing the operator to control the rotational speed of the motor 50 by the intermittent operation without feeling uncomfortable.

6. Other Embodiments

The embodiment of the present disclosure has been described above, but the present disclosure is not limited to the above-described embodiment and can be practiced with various modifications.

(6a) The aforementioned embodiment has been exemplified by the electric grass cutter, but the working machine to which the present disclosure is applied is not limited thereto. The present disclosure may be applied to working machines other than grass cutters, such as, for example, chainsaws, lawn mowers, and driver drills. The present disclosure may be applied not only to motor-driven working machines, but also to working machines driven by an internal combustion engine.

(6b) In the aforementioned embodiment, short-circuit braking is used as normal braking and free running is used as weak braking, but the present disclosure is not be limited thereto. Mechanical braking, for example, may be used instead of short-circuit braking. Braking using a motor, such as two-phase braking, that provides a braking force weaker than does short-circuit braking may be used instead of free running.

(6c) In the aforementioned embodiment, the operation mode is determined on the basis of counting results of the duration of the on operation (that is, the trigger on time, t_on) and of the duration of the off operation (that is, the trigger off time, t_off), but the present disclosure is not limited thereto. It may be determined from, for example, a ratio between the duration of the on operation and the duration of the off operation.

(6d) In the aforementioned embodiment, fixed values are used as the threshold on time, Ton, and the threshold off time, Toff, but the present disclosure is not limited thereto. For example, these thresholds, Ton and Toff, may be variably set according to a type of the working tool used and to the setting of the speed change dial 23.

(6e) In the aforementioned embodiment, the control circuit 36 may comprise a combination of various separate electronic components in place of or in addition to the microcomputer, may comprise an Application Specified Integrated Circuit (ASIC), may comprise an Application Specific Standard Product (ASSP), may comprise a programmable logic device such as an Field Programmable Gate Array (FPGA), or may comprise a combination thereof.

(6f) A plurality of functions of one element of the aforementioned embodiments may be performed by a plurality of elements, and one function of one element may be performed by a plurality of elements. Further, a plurality of functions of a plurality of elements may be performed by one element, and one function performed by a plurality of elements may be performed by one element. Further, part of the configurations of the aforementioned embodiments may be omitted. Still further, at least part of the configurations of the aforementioned embodiments may be added to or replaced with the configurations of the other above-described embodiments. Any embodiment included in the technical ideas defined by the language of the claims is an embodiment of the present disclosure.

(6g) The present disclosure can be practiced in various forms other than the above-described working machine, including a system comprising the working machine as an element thereof, a method of braking the working machine, etc.

What is claimed is:

1. A working machine comprising:
an operating device configured to be operated by an operator of the working machine;
a working tool configured to perform a work using a rotational force;
a driving device configured to rotationally drive the working tool in response to an on operation performed on the operating device;
a braking device configured to perform a brake control that reduces a rotational speed of the driving device in response to an off operation in which non-driving of the driving device is commanded to the driving device;
a detection device configured to detect a mode of an operation performed on the operating device, the operation corresponding to the off operation or the on operation; and
a change device configured to change the brake control according to the mode detected by the detection device,
wherein the detection device is configured to determine that the on operation is performed on the operating device,
wherein the detection device is configured to detect, as the mode, a duration of the on operation in which driving of the driving device is commanded to the driving device, based on determining that the on operation is performed on the operating device,
wherein the change device is configured to change the brake control to a normal brake control based on the duration of the on operation detected by the detection device being greater than a threshold on time that has been preset, the normal brake control using a normal braking force that has been preset,
wherein the detection device is further configured to detect a duration of the off operation as the mode, and
wherein the change device is configured to, in a case where the duration of the on operation detected by the detection device is equal to or shorter than the threshold of time, (i) change the brake control to the normal brake control based on the duration of the off operation detected by the detection device being greater than a threshold off time that has been preset, and (ii) change the brake control to a weak brake control based on the duration of the off operation being equal to or smaller than the threshold off time, the weak brake control using a braking force weaker than the normal braking force.

2. The working machine according to claim 1, wherein the threshold off time is set to be longer than a standard duration of the off operation for an intermittent operation, the intermittent operation corresponding to the on operation and the off operation being repeated alternately to control a rotational speed of the working tool.

3. The working machine according to claim 1, wherein the threshold on time is set to be longer than a standard duration of the on operation for an intermittent operation, the intermittent operation corresponding to the on operation and the off operation being repeated alternately to control a rotational speed of the working tool.

4. The working machine according to claim 1,
wherein the driving device comprises an electric motor.

5. The working machine according to claim 4,
wherein the brake control uses a free-run state that opens an excitation current path to the electric motor and/or short-circuit braking that short-circuits the excitation current path to the electric motor.

6. A method of braking a driving device of a working machine, the method comprising:
performing, by a braking device of the working machine, a brake control that reduces a rotational speed of the driving device in response to an off operation in which non-driving of the driving device is commanded to the driving device;
detecting, by a detection device of the working machine, a mode of an operation performed on an operating device of the working machine, the operation corresponding to the off operation or an on operation; and
changing, by a change device of the working machine, the brake control according to the mode detected,
wherein the method further comprises determining, by the detection device, that the on operation is performed on the operating device,
wherein the method further comprises detecting, by the detection device, as the mode, a duration of the on operation in which driving of the driving device is commanded to the driving device, based on determining that the on operation is performed on the operating device,
wherein the method further comprises changing, by the change device, the brake control to a normal brake control based on the duration of the on operation detected being greater than a threshold on time that has been preset, the normal brake control using a normal braking force that has been preset,
wherein the method further comprises detecting, by the detection device, a duration of the off operation as the mode, and
wherein the method further comprises, in a case where the duration of the on operation detected by the detection device is equal to or shorter than the threshold on time, (i) changing, by the change device, the brake control on the normal brake control based on the duration of the off operation detected by the detection device being greater than a threshold off time that has been preset, and (ii) changing, by the change device, the brake control to a weak brake control based on the duration of the off operation being equal to or smaller than the threshold off time, the weak brake control using a braking force weaker than the normal braking force.

7. A working machine comprising:
an operating device configured to be operated by an operator of the working machine;
a working tool configured to perform a work using a rotational force;
a driving device configured to rotationally drive the working tool in response to an on operation performed on the operating device;
a braking device configured to perform a brake control that reduces a rotational speed of the driving device in response to an off operation in which non-driving of the driving device is commanded to the driving device;
a control circuit configured to detect a mode of an operation performed on the operating device, the operation corresponding to the off operation or the on operation, and configured to change the brake control according to the mode detected,
wherein the control circuit is configured to determine that the on operation is performed on the operating device,
wherein the control circuit is configured to detect, as the mode, a duration of the on operation in which driving of the driving device is commanded to the driving device, based on determining that the on operation is performed on the operating device,
wherein the control circuit is configured to change the brake control to a normal brake control based on the duration of the on operation detected by the control circuit being greater than a threshold on time that has been preset, the normal brake control using a normal braking force that has been preset,
wherein the control circuit is further configured to detect a duration of the off operation as the mode, and
wherein the control circuit is further configured to, in a case where the duration of the on operation detected by the detection device is equal to or shorter than the threshold on time, (i) change the brake control to the normal brake control based on the duration of the off operation detected by the detection device being greater than a threshold off time that has been preset, and (ii) change the brake control to a weak brake control based on the duration of the off operation being equal to or smaller than the threshold off time, the weak brake control using a braking force weaker than the normal braking force.

* * * * *